United States Patent [19]

Kato

[11] Patent Number: 5,677,731
[45] Date of Patent: Oct. 14, 1997

[54] PROTECTIVE DEVICE AND A TELEVISION RECEIVER PROVIDED WITH IT

[75] Inventor: Hiroshi Kato, Takatsuki, Japan

[73] Assignee: Matsushita Electric Industrial Co., Ltd., Osaka, Japan

[21] Appl. No.: 520,571

[22] Filed: Aug. 29, 1995

[30] Foreign Application Priority Data

Aug. 29, 1994 [JP] Japan .................. 6-203210

[51] Int. Cl.$^6$ ............................... H04N 17/04
[52] U.S. Cl. ........................... 348/177; 348/189
[58] Field of Search ......................... 348/180, 184, 348/553, 725, 730, 733, 818, 819, 162, 163, 177, 189; 315/411

[56] References Cited

U.S. PATENT DOCUMENTS

| | | | |
|---|---|---|---|
| 4,058,754 | 11/1977 | Ohnishi et al. | 315/411 |
| 4,074,323 | 2/1978 | Griffey | 348/378 |
| 4,090,111 | 5/1978 | Suzuki | 315/411 |
| 5,430,596 | 7/1995 | Hamaguchi et al. | 361/86 |
| 5,491,794 | 2/1996 | Wu | 348/177 |

Primary Examiner—Victor R. Kostak
Attorney, Agent, or Firm—Ratner & Prestia

[57] ABSTRACT

A protective device for a television receiver having detection circuits to detect various types of malfunctioning of the television receiver. The protective device identifies the malfunction at the moment when the malfunction takes place and responds accordingly by classifying the types of malfunctioning into two groups: one group requiring immediate corrective action and the other group requiring a corrective action after observation of the malfunctioning for a certain time period. The protective device for a television receiver detects malfunctioning of the television receiver and outputs detection signals with the voltage values thereof differing from one another, produces a composite signal by combining the detection signals, and controls the time elapsed before the power supply is placed in a dormant state according to the voltage value of the foregoing composite detection signal.

6 Claims, 2 Drawing Sheets

PROTECTIVE DEVICE AND A TELEVISION RECEIVER PROVIDED WITH IT

BACKGROUNDS OF THE INVENTION

1. Field of the Invention

The present invention relates to a protective device to protect viewers of a television receiver from dangers which might be inflicted secondarily on the viewers from malfunctioning of the television receiver showing unusual values of various characteristics in performance caused by some reasons, and to ensure safety of the television receiver (to be referred to simply as "protective device" hereafter), and/or a protective device to prevent a danger of the foregoing malfunctioning from further damaging component parts of the television receiver.

2. Prior Art

According to the prior art, a television receiver is provided with an overcurrent protective circuit, an over-voltage protective circuit or the like for possible failures of the component parts thereof, and when these detective circuits detect any malfunctioning, the function of failed circuit is suspended by ceasing the oscillation of the horizontal oscillator, for example, or by cutting off the supply of power, thereby ensuring to maintain safety of the television receiver.

FIG. 2 shows one of the examples of a protective device used in a prior art television receiver.

In FIG. 2, an overcurrent detective circuit 3 is in place between a power supply circuit 1 and a flyback transformer 2, and the overcurrent detective circuit 3 is activated when malfunctioning happens in the secondary winding of the flyback transformer 2 and the current from the power supply circuit 1 increases abnormally.

When the application voltage to the flyback transformer 2, increases for something wrong caused to happen in the power supply circuit 1 or for some other reasons, the high voltage applied to a cathode ray tube 4 increases and an abnormal voltage is caused to happen for some other reasons, resulting in activating an overvoltage detective circuit 5.

Whenever the overcurrent detective circuit 3 or overvoltage detective circuit 5 is activated, a microprocessor 6 activates a relay-off circuit 7 to make a power supply relay 9 break by grounding the base of a relay driving transistor 8 to the earth terminal, thereby causing the power supply relay 9 to break and suspending a supply of power from the power supply circuit 2 for safety of the television receiver.

Thus, according to the prior art method, each respective detective circuit intended for detecting malfunctioning of a television receiver by finding abnormal values of the various characteristics thereof is activated spontaneously in response to each respective abnormal condition, thereby suspending a supply of the power to the specified circuit and/or placing the television receiver in a dormant state by stopping the function of the specified circuit by activating the microprocessor or the control circuit corresponding to any selected detective circuits in the same common manner. However, because the response time of each respective detective circuit is not taken into consideration with the prior art method, detective circuits are sometimes activated too quickly even when any protective actions are not needed, resulting in an excessive reaction to cause various problems of inconveniences in practice.

Especially, in connection with a protective device for X ray radiations, when an unusual signal that may not be lasting long is caught momentarily by the protective circuit having a high accuracy detection capability of detection even a small change in a certain property that is closely related to the X ray radiations, the foregoing detective circuit is likely to output signals on the foregoing property so that the signals may be judged as abnormal, and upon receipt of the signals the detective device may end up with turning off the power supply to the specified circuit and placing inconveniently the television receiver in a dormant state.

However, a protective action for a television receiver is required with regard to this kind of property of X ray radiations only when the abnormal condition signaled by the detective circuit sustains for a certain period, and is not necessarily required in an immediate response to the abnormal signals.

On the other hand, a protective action according to other properties of a television receiver like an excessive current flow for example, requires an immediate response in order to prevent the relating component parts from breaking down.

The object of the present invention is to provide a protective device for a television receiver solving the foregoing problems by separating the malfunctioning thereof that requires an immediate corrective action from that of requiring a response only after a continued state of the malfunctioning for a certain period.

SUMMARY OF THE INVENTION

For achieving the foregoing object, a television receiver is provided with a protective device of the present invention comprising:

malfunctioning detective means 1st through n'th to detect a 1st abnormal condition through an n'th abnormal condition of the television receiver, respectively;

a composite detective signal generating means to combine the output signals from at least two or more of the foregoing malfunctioning detective means 1st through n'th a malfunctioning identifying means to identify and classify the output signals from the foregoing composite detective signal generating means according to a plurality of the malfunctioning classifications established in advance; and a control circuit for controlling the power supply circuit of the foregoing television receiver according to the malfunctioning classifications of the output signals from the foregoing malfunctioning identifying means.

The present invention discloses a method of separating the malfunctioning of a television receiver that requires an immediate corrective action from the malfunctioning that should be responded after a certain elapse of time by means of a plurality of detective means which detect various kinds of malfunctioning of the television receiver and output detective signals classified by the magnitude of voltages according to each respective nature of malfunctioning, and by means of generating a composite detective signal by combining a plurality of the foregoing detective signals and controlling the time period before an already established circuit of the television receiver is placed in a dormant state according to the voltage value of the composite detective signal.

DETAILED DESCRIPTION OF THE INVENTION

Figure 1:
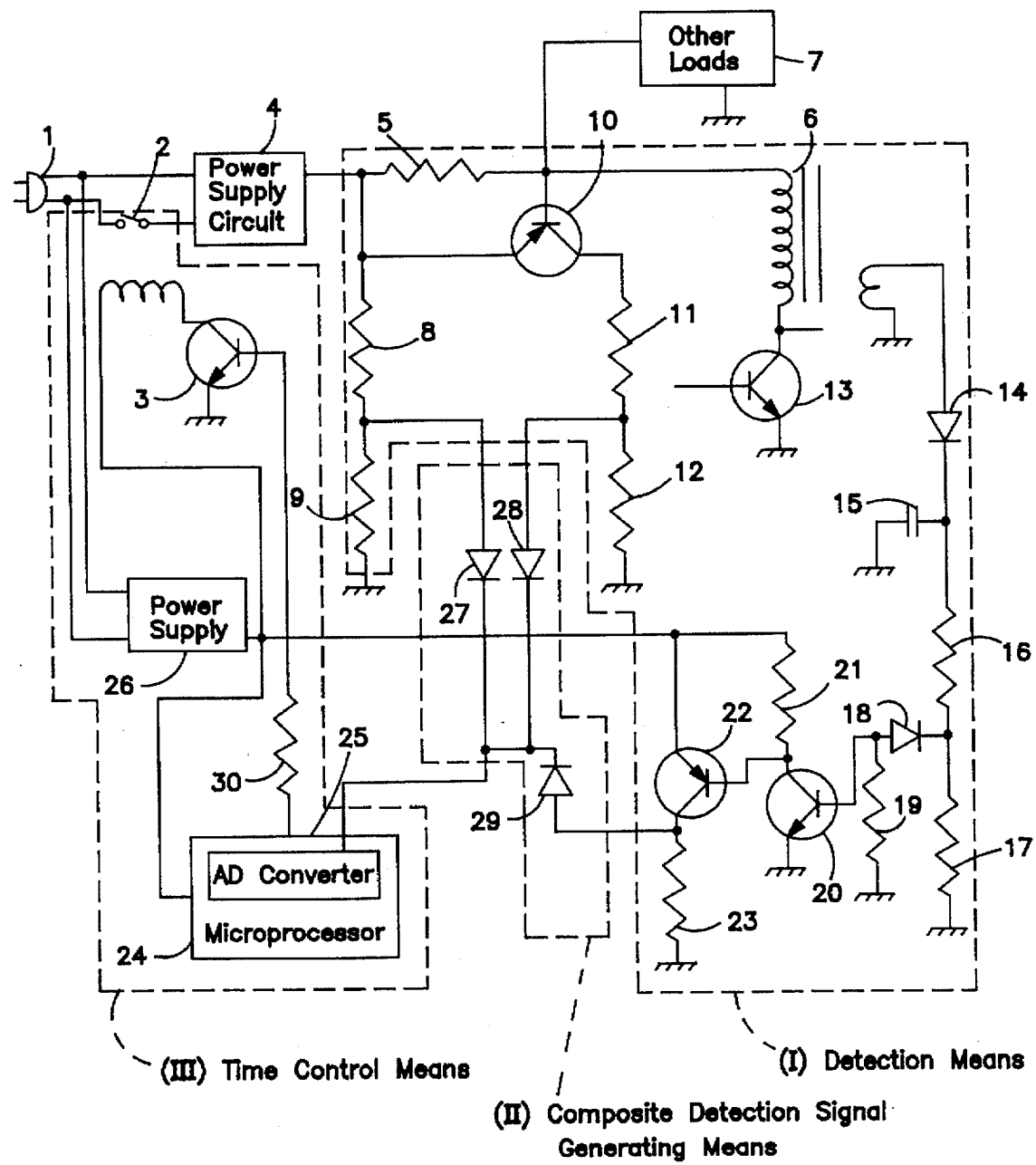
FIG. 1 is a circuit diagram of a detective device as one exemplary embodiment of the present invention.
Figure 2:
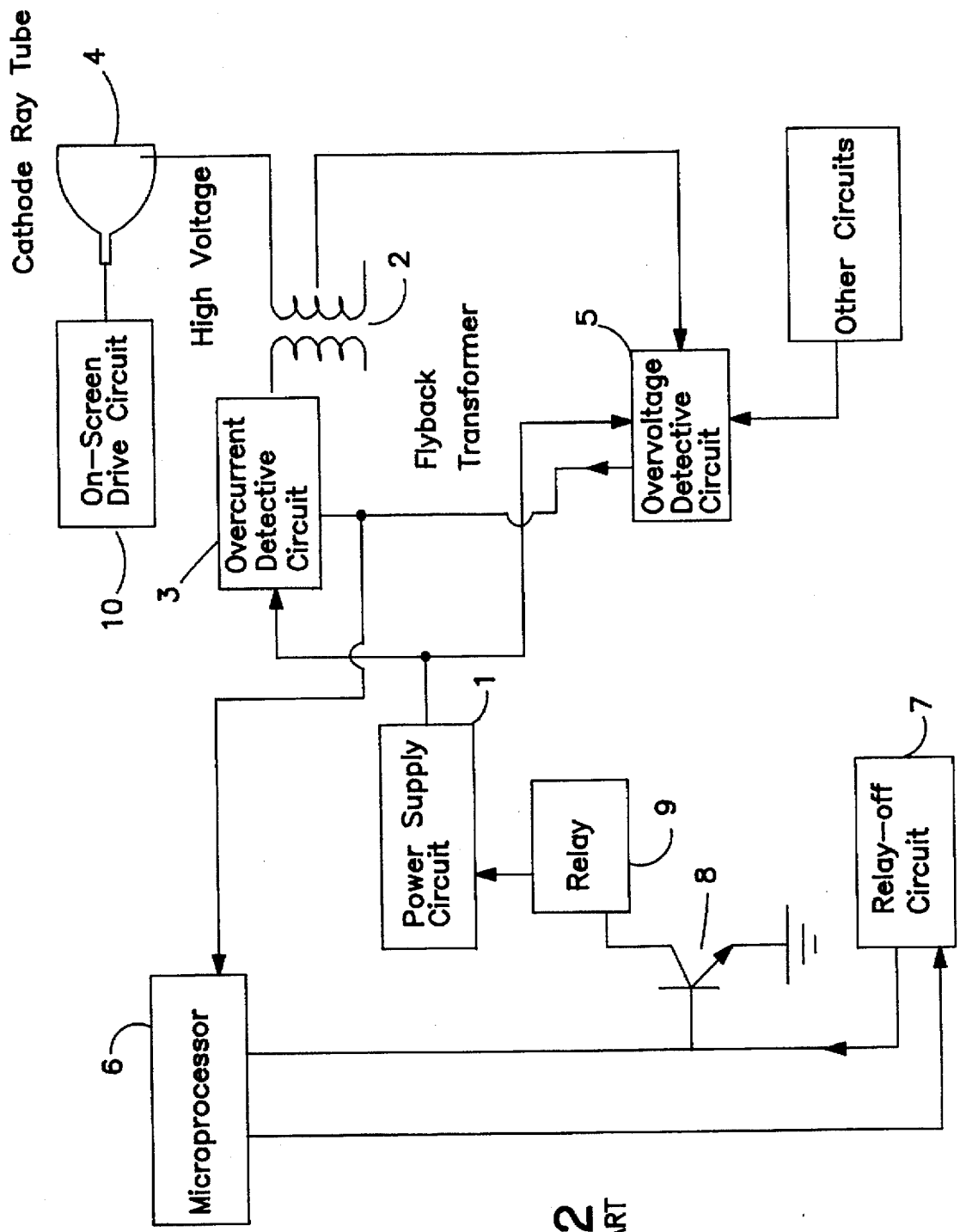
FIG. 2 is a circuit diagram of an example of a detective device of the prior art.

Some exemplary embodiments of the present invention will be explained with the help of drawings in the following:

FIG. 1 shows a schematic diagram of a protective device as an exemplary embodiment of the present invention. An AC power is supplied through an AC plug 1 to a power supply circuit 4 passing a relay 2 which is controlled by a relay driving transistor 3.

When the relay driving transistor 3 is in an ON state, i.e., in the state wherein the relay driving transistor 3 is activating the relay 2, the relay 2 is closed, thereby the power supply circuit 4 supplying electric power.

On the other hand, an AC power is supplied to a microprocessor power supply 26 through the AC plug 1 directly without going through the foregoing power supply circuit 4 and the relay 2.

The power supply circuit 4 serves as a main power source for the main chassis of a television receiver, which is turned on or off according to the "make" or "break" state of the relax 2, and the output thereof is fed to a flyback transformer 6 and other loads 7 through a resistor 5.

A voltage divider formed of resistors 8 and 9 connected in series with each other is connected to the main power source at the one end thereof and grounded at the other end, thereby dividing the main power source voltage.

The detection of abnormal conditions of the main power source voltage is made by the values outputted from the voltage divider.

An overcurrent flowing through the resistor 5 makes the voltage drop across the resistor 5 large enough to turn on an overcurrent detection transistor 10, and the current flowing through the overcurrent detection transistor 10 also flows through a voltage divider formed of resistors 11 and 12 connected in series with each other, one end of which is connected to the overcurrent detection transistor 10 and the other end of which is grounded, thereby dividing the main power source voltage.

The detection of abnormal conditions of the current flowing out of the power supply circuit 4 is made by the divided voltage values of the foregoing voltage divider.

A horizontal output transistor 13 drives a horizontal deflection circuit (not shown in FIG. 1) through the flyback transformer 6, thereby supplying a high voltage power to a cathode ray tube.

The voltage generated at the secondary winding of the flyback transformer 6 is rectified by a diode 14 and a smoothing capacitor 15, producing a rectified voltage which is proportionate to the high voltage applied to the cathode ray tube.

The foregoing rectified voltage is divided by a voltage divider forged of resistors 16 and 17 connected in series with each other, one end of which is connected to the junction between the foregoing diode 14 and smoothing capacitor 15 and the other end of which is grounded.

The foregoing divided voltage is supplied to a resistor 19 and the base of a transistor 20 through a zener diode 18. The resistor 19 and transistor 20 forms an inversion amplifier, and the output thereof is fed to an inversion amplifier formed of a transistor 22 and a resistor 23.

The detection of abnormal conditions in the high voltage value is made by the voltage value produced across the resistor 23.

As described in the foregoing, the protective device of the present invention comprises a plurality of detection means, whereby a plurality of detection signals arm outputted after having detected various abnormal conditions of a television receiver.

A special attention should be paid here to the fact that the detection of abnormal conditions of the main power source voltage utilizes a voltage proportionate to the main power source voltage.

Besides, the detection of abnormal conditions of a current flowing out of the power supply circuit 4 utilizes a voltage proportionate to the voltage that is produced by the current flowing through the overcurrent detection transistor 10 when the current from the power supply circuit 4 exceeds a certain specified value and causes the overcurrent detection transistor 10 to turn on, thereby enhancing the detection sensitivity of the overcurrent detection when compared with that of the abnormal conditions in the main power source voltage.

In contrast, since a voltage outputted from two stages of a high gain inversion amplifier for amplifying a voltage produced across the resistor 19 by a current flowing over the zener diode 18 is utilized in detecting the abnormal conditions of the high voltage value, the detection sensitivity of the abnormal condition detection of the high voltage value is much higher when compared with that of the abnormal condition detection in the main power source voltage and the overcurrent detection.

In addition, the foregoing respective detected values are different from one another.

A malfunctioning detection means (I) comprises a plurality of detection means, whereby the foregoing respective abnormal conditions are detected and a plurality of detection signals having voltage values different from one another are outputted.

There is a microprocessor 24, inside of which an AD converter 25 is contained.

The microprocessor power supply 26 supplies power to the relay driving transistor 3 that drives the microprocessor 24 and the relay 2, even when the TV's power supply circuit 4 is turned off and the television receiver is in a dormant state.

In order to put together the detected output resulting from abnormal conditions of the main power source voltage outputted from the power supply circuit 4, the detected output resulting from abnormal conditions of the current flown out of the power supply circuit 4 and the detected output resulting from abnormal conditions of the high voltage value, these output are fed to the anodes of diodes 27, 28 and 29, respectively, and then to the AD converter 25 of the microprocessor 24 through the diodes' cathodes connected together.

A composite detective signal generating means (II) comprises circuits for producing composite detective signals by putting together a plurality of the detective signals outputted from the foregoing malfunctioning detection means (I) by means of these diodes 27, 28 and 29.

The foregoing malfunctioning identifying means and also a time control means (III) to control the time elapsed before the television receiver is placed in a dormant state by controlling the foregoing power supply circuit 4 contained inside of the television receiver comprise the microprocessor 24 that has the foregoing AD converter 25, a resistor 30, the relay driving transistor 3, the relay 2 and the microprocessor power supply 26.

A detective device for television receivers of the present invention comprises the foregoing malfunctioning detection means (I), composite detective signal generating means (II) and time control means (III).

The input voltage ranging from 0 V to 5 V to the AD converter 25 contained in the microprocessor 24 is classified into 4 ranges, and the output from the microprocessor 24 is fed to the relay driving transistor 3 through the resistor 30 according to the foregoing classification of the input voltage to the AD converter 25.

First, when the composite detective signal value, i.e., the input voltage to the AD converter 25 falls in a first range of 0 V to 1.25 V, the microprocessor 24 judges that the television receiver 18 functioning properly and does not drive the relay driving transistor 3.

When the input voltage to the AD converter 25 falls in a second range of 1.25 V to 2.25 V and in a third range of 2.5 V to 3.75 V, the microprocessor 24 judges that the television receiver is malfunctioning with an overvoltage or overcurrent and activates the relay driving transistor 3 in a short period, thereby the relay 2 turning off the power supply circuit 4 to place the television receiver in a dormant state.

Further, when the input voltage to the AD converter 25 falls in a fourth range of 3.75 V to 5.0 V, the microprocessor 24 judges that the high voltage value of the television receiver is in an abnormal condition and only when this abnormal condition continues for a certain specified period the microprocessor 24 activates the relay driving transistor 3, thereby the relay 2 turning off the power supply circuit 4 to place the television receiver in a dormant state. The resistance values of the resisters 8 and 9 are so decided as to make the cathode voltage of the diode 27 fall in the first voltage range for a normal condition of the voltage from the power supply circuit 4 even if an overvoltage is detected, and fall in the second voltage range for a voltage higher than that of the normal time.

The resistance values of the resisters 5, 11 and 12 are so decided as to make the cathode voltage of the diode 28 fall in the first voltage range for a normal condition of the current from the power supply circuit 4 even if an overcurrent is detected, and fall in the third voltage range for a current larger than that of the normal time.

The resistance values of the resisters 16, 17, 19, 21 and 23 are so decided as to make the cathode voltage of the diode 29 fall in the first voltage range for a normal condition of the high voltage even when a high voltage is detected, and fall in the fourth voltage range by skipping the second and third voltage ranges for an abnormally high voltage value in the high voltage, which results in activating the transistors 20 and 22

Thus, the microprocessor 24 provides a malfunctioning identifying means.

Next, how a protective device of the present invention is operated will be explained in detail with the help of FIG. 1.

When a television receiver itself and all the surrounding conditions thereof including the AC power supply voltage and the like are under normal conditions, the voltages from the power supply circuit 4 contained in the television receiver chassis are indicating normal values, and the power source voltage divided by the resisters 8 and 9 falls in the first range when measured at the cathode of the diode 27.

Next, the current flowing through the resistor 5 is low enough in value under normal conditions, thereby turning off the transistor 10, and there is no potential appearing on the collector of the transistor 10. Therefore, the cathode voltage of the diode 28 also falls in the first range. Also, the high voltage value is normal and the pulse voltage produced in the secondary winding of the flyback transformer 6 is rectified and smoothed by the diode 14 and capacitor 15, and then divided by the resistors 16 and 17. the foregoing divided voltage is lower in value than the zener voltage of the zener diode 18.

Therefore, the transistor 20 is turned off and the collector potential becomes "H". The transistor 22 is also turned off and the cathode potential of the diode 29 also falls in the first range.

Thus, when everything is under normal conditions, the voltage inputted to the AD converter 25 of the microprocessor 24 falls in the first range and the microprocessor 24 continues to maintain a power supply for the television receiver.

Next, suppose the output voltage from the power supply circuit 4 has become abnormally high for some reasons. Then, the voltage divided by the resistors 8 and 9 increases and the cathode potential of the diode 27, i.e., the input voltage to the AD converter 25 of the microprocessor 24 may fall in the second range.

In this case, the microprocessor 24 judges that abnormal conditions of overvoltages or overcurrents have occurred, the relay driving transistor 3 is activated in a short period to break the relay 2, thereby turning off the power supply circuit 4 and placing the television receiver in a dormant state.

When the current passing through the resistor 5 becomes abnormally large for some reasons, the potential between the emitter and base of the transistor 10 increases and the transistor 10 may be turned on.

As a result, the voltage that appears at the collector of the transistor 10 is divided by the resistors 11 and 12, and the cathode potential of the diode 29, i.e., the input potential to the AD converter 25 of the microprocessor 24 may be falling in the third range.

Then, the microprocessor 24 judges that an abnormal condition of an overvoltage or an overcurrent has happened in the same way as with the time of the second range, and the relay driving transistor 3 is activated in a short period to break the relay 2, thereby turning off the power supply circuit 4 and placing the television receiver in a dormant state.

When an abnormal condition in the high voltage arises momentarily even under normal operating conditions of a television receiver, the horizontal AFC circuit of the deflection system is brought in an erroneous operation momentarily and the input potential to the AD converter 25 of the microprocessor 24 may be temporarily drawn into the fourth range for the reasons that the signal received was non-standard, the RF carrier frequency was shifted a little, the video frequency was drawn into the audio carrier signal and the like.

Further, when due to some causes there happens an abnormal condition in the high voltage wherein an excessively increased voltage thereof brings about the danger of X ray radiations, the pulse voltage produced in the secondary winding of the flyback transformer 6 is increased in proportion to the high voltage value. The voltage divided by the resistors 16 and 17 exceeds the zener voltage of the zener diode 18 and turns on the transistor 20, thereby turning the collector voltage of the transistor 20 to "L". Besides, the foregoing divided voltage turns on the transistor 22, resulting in an increase of the cathode potential of the diode 29, i.e., the input potential of the AD converter 25 of the microprocessor 24 to the fourth range. At this time, the rise of the foregoing input potential is so steep that the input potential reaches the fourth range before the microprocessor 24 misjudges it to belong to the foregoing second or third range during the course of rising in the foregoing input voltage.

Then, the microprocessor 24 judges that an abnormally high voltage has been produced, and activates the relay driving transistor 3 after having confirmed that the input voltage to the AD converter 25 stays with the fourth range by watching the voltage value for 30 seconds, for example, resulting in breaking the relay 2 to turn off the power supply circuit 4, thereby placing the television receiver in a dormant state.

Accordingly, a stabilized performance can be obtained from the protective device.

The technology disclosed by the present invention makes it possible for a television receiver to avoid an erroneous operation of placing it in a dormant state, when an abnormally high voltage is generated momentarily although the high voltage is not due to some malfunctioning, by placing the television receiver in a dormant state only after seeing the state of staying in the fourth range continue for a certain specified period.

Also, the present invention can provide a protective device for a television receiver to cope with the malfunctioning thereof by first classifying the malfunctioning into two categories, i.e., one requiring an immediate corrective action and the other requiring a corrective action after confirming that the malfunctioning continues for some time.

What is claimed is:

1. A television receiver provided with a protective device comprising:
    malfunction detecting means for detecting a plurality of abnormal points of the television receiver, and for outputting a first plurality of signals responsive to said abnormal points;
    composite detecting signal generating means for combining the output signals from said malfunction detecting means and for outputting a second plurality of signals responsive to said abnormal points;
    malfunction identifying means for identifying and classifying the output signals from said composite detecting signal generating means into a plurality of the malfunction classes established in advance; and
    control means for controlling the power supply circuit of said television receiver according to the malfunction classes of the output signals from said malfunction identifying means.

2. A television receiver provided with a protective device comprising:
    malfunction detecting means for detecting a plurality of abnormal conditions of the television receiver;
    composite detecting signal generating means for combining the output signals from said malfunction detecting means;
    malfunction identifying means for identifying and classifying the output signals from said composite detecting signal generating means according to a plurality of the malfunction classifications established in advance; and
    control means for controlling the power supply circuit of said television receiver according to the malfunction classifications of the output signals from said malfunction identifying means,
    wherein said plurality of the malfunction classifications are established according to the length of time elapsed before the supply of power to the television receiver is cut off by said control means for controlling the power supply circuit of said television receiver.

3. A television receiver provided with a protective device comprising:
    malfunction detecting means for detecting a plurality of abnormal conditions of the television receiver;
    composite detecting signal generating means for combining the output signals from said malfunction detecting means;
    malfunction identifying means for identifying and classifying the output signals from said composite detecting signal generating means according to a plurality of the malfunction classifications established in advance;
    control means for controlling the power supply circuit of said television receiver according to the malfunction classifications of the output signals from said malfunction identifying means;
    a plurality of places where power is supplied; and
    power supply controlling means for controlling at least one of said plurality of power supplied places.

4. A television receiver provided with a protective device comprising:
    malfunction detecting means for detecting a plurality of abnormal conditions of the television receiver;
    composite detecting signal generating means for combining the output signals from said malfunction detecting means;
    malfunction identifying means for identifying and classifying the output signals from said composite detecting signal generating means according to a plurality of the malfunction classifications established in advance; and
    control means for controlling the power supply circuit of said television receiver according to the malfunction classifications of the output signals from said malfunction identifying means,
    wherein the length of time elapsed before the supply of power to the television receiver is cut off by said control means for controlling the power supply circuit of said television receiver is set for the longest time in case where a cathode ray tube is employed by the television receiver and an abnormal condition is detected in the high voltage used as the acceleration voltage of said cathode ray tube by said malfunction detecting means.

5. A television receiver provided with a protective device comprising:
    malfunction detecting means for detecting a plurality of abnormal conditions of the television receiver;
    composite detecting signal generating means for combining the output signals from said malfunction detecting means;
    malfunction identifying means for identifying and classifying the output signals from said composite detecting signal generating means according to a plurality of the malfunction classifications established in advance; and
    control means for controlling the power supply circuit of said television receiver according to the malfunction classifications of the output signals from said malfunction identifying means,
    wherein the abnormal conditions detected by said malfunction detecting means comprise at least overcurrent and overvoltage occurring within the television receiver.

6. A protective device for a television receiver comprising:

plurality of detection means to detect various abnormal points of the television receiver and output a plurality of detection signals of a voltage responsive to the various abnormal points;

means to produce a plurality of composite detecting signals responsive to the various abnormal points by combining said plurality of detection signals;

malfunction identifying means for identifying and classifying said composite detecting signals according to a plurality of the malfunction classification established in advance; and control means to control a lapse time before the power supply is turned into stand-by mode according to at least one of the malfunction classification of the output signals from said malfunction identifying means.

* * * * *